(12) United States Patent
Horn et al.

(10) Patent No.: US 6,634,630 B2
(45) Date of Patent: Oct. 21, 2003

(54) CLAMPING AND LIFTING MECHANISM

(75) Inventors: Edward R. Horn, Oconomowoc, WI (US); Vladimir S. Novak, Appleton, WI (US); Robert E. Dowd, Oconomowoc, WI (US); Leonid Dukhin, deceased, late of Miami Beach, FL (US), by Rakhil Dukhin, legal representative

(73) Assignee: Aladdin Engineering & Manufacturing, Waukesha, WI (US)

( * ) Notice: Subject to any disclaimer, the term of this patent is extended or adjusted under 35 U.S.C. 154(b) by 0 days.

(21) Appl. No.: 09/955,483

(22) Filed: Sep. 18, 2001

(65) Prior Publication Data

US 2002/0084564 A1 Jul. 4, 2002

(Under 37 CFR 1.47)

Related U.S. Application Data

(63) Continuation-in-part of application No. 09/323,630, filed on Jun. 1, 1999, now Pat. No. 6,290,210.

(51) Int. Cl.$^7$ ................................................. B23Q 3/08
(52) U.S. Cl. ...................................................... 269/34
(58) Field of Search ...................... 269/32, 34; 254/18; 294/88, 115

(56) References Cited

U.S. PATENT DOCUMENTS

| | | |
|---|---|---|
| 1,771,712 A | 7/1930 | Jimerson |
| 2,439,483 A | 4/1948 | Merriman |
| 2,815,052 A | 12/1957 | Krasnow |
| 2,908,205 A | 10/1959 | Furman et al. |
| 2,972,476 A | 2/1961 | Blatt |
| 3,108,794 A | 10/1963 | Blatt |
| 3,273,878 A | 9/1966 | Blatt |
| 3,302,943 A | 2/1967 | Mericle, Jr. |
| 3,362,703 A | 1/1968 | Blatt |
| 3,371,923 A | 3/1968 | Blatt |
| 3,371,953 A | 3/1968 | Blatt |
| 3,381,954 A | 5/1968 | Blatt |
| 3,482,830 A | 12/1969 | Sendoykas |
| 3,482,831 A | 12/1969 | Blatt |

(List continued on next page.)

OTHER PUBLICATIONS

The World of Clamping Booklet by De–Sta–Co, Division of Dover Corporation, 1984.

*Primary Examiner*—Robert C. Watson
(74) *Attorney, Agent, or Firm*—Michael Best & Friedrich LLP

(57) ABSTRACT

A clamp for clampingly engaging a portion of a workpiece and for lifting the workpiece from a work surface. The clamp comprises a fluid actuated piston and cylinder assembly, a frame assembly, first and second clamp arms supported by the frame assembly for pivotal movement about respective first and second pivot axes and axial movement parallel to the longitudinal axis between an unclamped position and a clamped and lifted position, first and second pivot pins respectively defining the first and second pivot axes, first and second slider members respectively supported in first and second tracks for axial movement relative to frame assembly and respectively supporting the first and second pivot pins for axial movement along the first and second tracks relative to the frame assembly, first and second link pins supported proximate the opposite ends of the first and second clamp arms, respectively, the first link pin being movable along the first arcuate track and the first track and the second link pin being moveable along the second arcuate track and the second track, first and second link members connecting the first and second link pins, respectively, to the piston such that movement of piston between the extended position and the retracted position causes movement of the first and second clamp arms between the unclamped position and the clamped and lifted position.

39 Claims, 7 Drawing Sheets

U.S. PATENT DOCUMENTS

| | | |
|---|---|---|
| 3,545,050 A | 12/1970 | Blatt et al. |
| 3,570,835 A | 3/1971 | McPherson |
| 3,618,931 A | 11/1971 | Blatt |
| 3,702,185 A | 11/1972 | Blatt |
| 4,021,027 A | 5/1977 | Blatt |
| 4,240,620 A | 12/1980 | Tunkers |
| 4,449,745 A | 5/1984 | Blatt |
| 4,576,367 A | 3/1986 | Horn et al. |
| 4,596,415 A | 6/1986 | Blatt |
| 4,679,782 A | 7/1987 | Horn et al. |
| 5,072,652 A | 12/1991 | Blatt | ically driven piston, is opera-
CLAMPING AND LIFTING MECHANISM

RELATED APPLICATIONS

The present application is a continuation-in-part of co-pending U.S. patent application Ser. No. 09/323,630, filed Jun. 1, 1999 now U.S. Pat. No. 6,290,210.

FIELD OF THE INVENTION

The invention relates to clamping and gripping devices and, more particularly, to a mechanism for clamping a workpiece and lifting the workpiece from a work surface during a manufacturing operation.

BACKGROUND OF THE INVENTION

One type of conventional assembly for clamping a workpiece and lifting the workpiece from a work surface includes a clamping mechanism and a separate lifting mechanism. The clamping mechanism generally includes a pair of clamp arms pivotally supported by a frame. Each clamp arm has an end for engaging the workpiece and is supported by the frame for pivotal movement about a pivot axis. A drive mechanism, such as a pneumatically driven piston, is operatively connected to the clamp arms through a link assembly to cause pivotal movement of the clamp arms between a clamped position, in which the clamp arms clampingly engage the workpiece, and an unclamped position.

The separate lifting mechanism is provided to lift the clamping mechanism while the workpiece is clamped. The workpiece is thereby lifted from the work surface so that, for example, the workpiece can be moved to another work surface. The lifting mechanism is generally operable between a lifted position and a non-lifted position.

SUMMARY OF THE INVENTION

One independent problem with the above-described conventional clamping and lifting assembly is that the assembly includes a clamping mechanism and a separate lifting mechanism. As a result, the assembly requires separate components for the clamping mechanism and for the lifting mechanism. This increases the cost and complexity of the conventional clamping and lifting assembly.

Another independent problem with the conventional assembly is that separate controls are required for the clamping mechanism and for the lifting mechanism. This increases the complexity of the control system for the assembly.

Yet another independent problem with the conventional assembly is that, because separate controls are provided for the clamping mechanism and the separate lifting mechanism, the control for the clamping mechanism may be accidentally operated so that the clamping mechanism moves to the unclamped condition while the lifting mechanism is still in the lifted condition, causing the lifted workpiece to be dropped.

A further independent problem with the conventional assembly is that, if fluid pressure is lost while the workpiece is clamped and lifted, the lifting mechanism may move to the unlifted condition and/or the clamping mechanism may move to the unclamped condition, causing the workpiece to be dropped.

The present invention provides an improved clamping and lifting mechanism that substantially alleviates one or more of the above-described and other problems of conventional clamping and lifting assemblies. The present invention provides a clamp combining clamping and lifting of a workpiece in a single mechanism. The clamping and the lifting of the workpiece are controlled by a single control assembly. This provides a simpler and less expensive mechanism.

Also, the present invention provides a clamp in which the workpiece cannot be accidentally unclamped while in a lifted position. Further, when the workpiece is clamped and lifted, the clamp is mechanically locked in this condition so that a loss of fluid pressure will not result in the workpiece being dropped and/or unclamped.

The present invention provides a clamp for clampingly engaging a portion of a workpiece and for lifting the workpiece from a work surface. The clamp comprises a frame assembly defining a longitudinal axis, an actuating assembly supported by the frame assembly and including a movable member, the actuating assembly preferably being a fluid actuated piston and cylinder assembly including a reciprocating piston having a projecting end movable between a retracted position and an extended position, and at least one clamp arm and, preferably, first and second clamp arms supported by the frame assembly for pivotal movement about respective first and second pivot axes and for axial movement relative to the frame assembly along the longitudinal axis, the first and second clamp arms being connected to the piston. Movement of the projecting end from the extended position to an intermediate position causes pivotal movement of the clamp arms to a clamped position, in which the workpiece is clampingly engaged by the clamp arms. Further movement of the projecting end from the intermediate position to the retracted position causes axial movement of the clamp arms to the clamped and lifted position.

Preferably, the first and second pivot axes are axially moved relative to the frame assembly as the clamp arms are moved from the clamped position to the clamped and lifted position. The clamp preferably further comprises first and second pivot pins respectively defining the first and second pivot axes, and the pivot pins are axially moved relative to the frame assembly as the clamp arms are moved from the clamped position to the clamped and lifted position.

Preferably, the frame assembly defines axially extending first and second tracks, and the first and second pivot pins are respectively supported in the first and second tracks for axial movement along the tracks relative to the frame assembly. The clamp may further comprise first and second slider members respectively supported in the first and second tracks for axial movement along the tracks relative to the frame assembly, and the first and second slide members respectively support the first and second pivot pins so that the pivot pins are axially movable relative to the frame assembly.

The clamp preferably further comprises first and second link pins supported proximate the opposite ends of the first and second clamp arms, respectively, and first and second link members connecting the first and second link pins, respectively, to the projecting end such that movement of the projecting end between the extended position and the retracted position causes movement of the clamp arms between the unclamped position and the clamped and lifted position.

The clamp may further preferably comprise first and second track follower pins supported by the first and second clamp arms, respectively. When the clamp arms are in the unclamped position, the first track follower pin is positioned in a first arcuate track and the second track follower pin is positioned in a second arcuate track. As the clamp arms move from the unclamped position to the clamped position, the first track follower pin moves along the first arcuate track and the second track follower pin moves along the second arcuate track. As the clamp arms move from the clamped position to the clamped and lifted position, the first track follower pin moves along the first track and the second track follower pin moves along the second track, and as the first and second track follower pins move along the first and second tracks, respectively, the clamp arms are prevented from moving to the unclamped position.

Also, as the first track follower pin moves from the first arcuate track to the first track, a portion of the first track follower pin preferably moves into the first cam portion. Similarly, as the second track follower pin moves from the second arcuate track to the second track, a portion of the second track follower pin preferably moves into the second cam portion. When the clamp arms move from the clamped position to the clamped and lifted position, the first and second cam portions are substantially misaligned with the first and second arcuate tracks, respectively, such that the clamp arms are prevented from moving to an unclamped position.

Preferably, the slider members are supported with play in the first and second tracks, respectively, and, when the clamp arms are in the clamped and lifted position, a clamping force applied by the clamp arms causes the first and second slider members to pivot about the first and second link pins, respectively, to become wedged in the first and second track, respectively.

The clamp may further comprise a lift member supported by the projecting end and having a surface engageable with the first and second link members. When the clamp arms are moved to the clamped and lifted position, the surface engages the first and second link members to move the link members to an over-center position.

In addition, the clamp may comprise first and second track followers respectively supported by the first and second link pins, the first track follower being movable along the first arcuate track and the first track, and the second track follower being movable along the second arcuate track and the second track. Also, the clamp may comprise a piston link pin supported by the projecting end and connecting the piston to the first and second link members, and a roller supported by the piston link pin and movable along the center track.

Further, the clamp may comprise first and second workpiece retaining spring assemblies supported in the workpiece engaging end of the first and second clamp arms, respectively.

One independent advantage of the present invention is that a single mechanism is capable of both clamping a workpiece and then lifting the workpiece from a work surface, reducing the cost and complexity of the mechanism.

Another independent advantage of the present invention that the first and second clamp arms are moveable between an unclamped position and a clamped and lifted position relative to the frame by a single piston cylinder assembly, rather than having a separate assembly to lift the clamping mechanism. Also, only a single control is required to control both the clamping and the lifting of the workpiece. This also reduces the cost and complexity of the mechanism and the control for the mechanism.

Yet another independent advantage of the present invention is that, by positioning of the link pins in the axially extending tracks while the clamp arms are moved from the clamped position to the clamped and lifted position, the clamp arms are prevented from moving to the unclamped position as the workpiece is lifted.

A further independent advantage of the present invention is that, when the workpiece is in the clamped and lifted position, the clamp is mechanically locked in this condition so that a loss of fluid pressure does not result in the workpiece being dropped and/or unclamped.

Other independent features and independent advantages of the invention will become apparent to those skilled in the art upon review of the following detailed description, claims and drawings.

BRIEF DESCRIPTION OF THE DRAWINGS

FIG. 5 is a side view of the mechanism shown in FIG. 1 illustrating the mechanism in the clamped condition.

Figure 1:
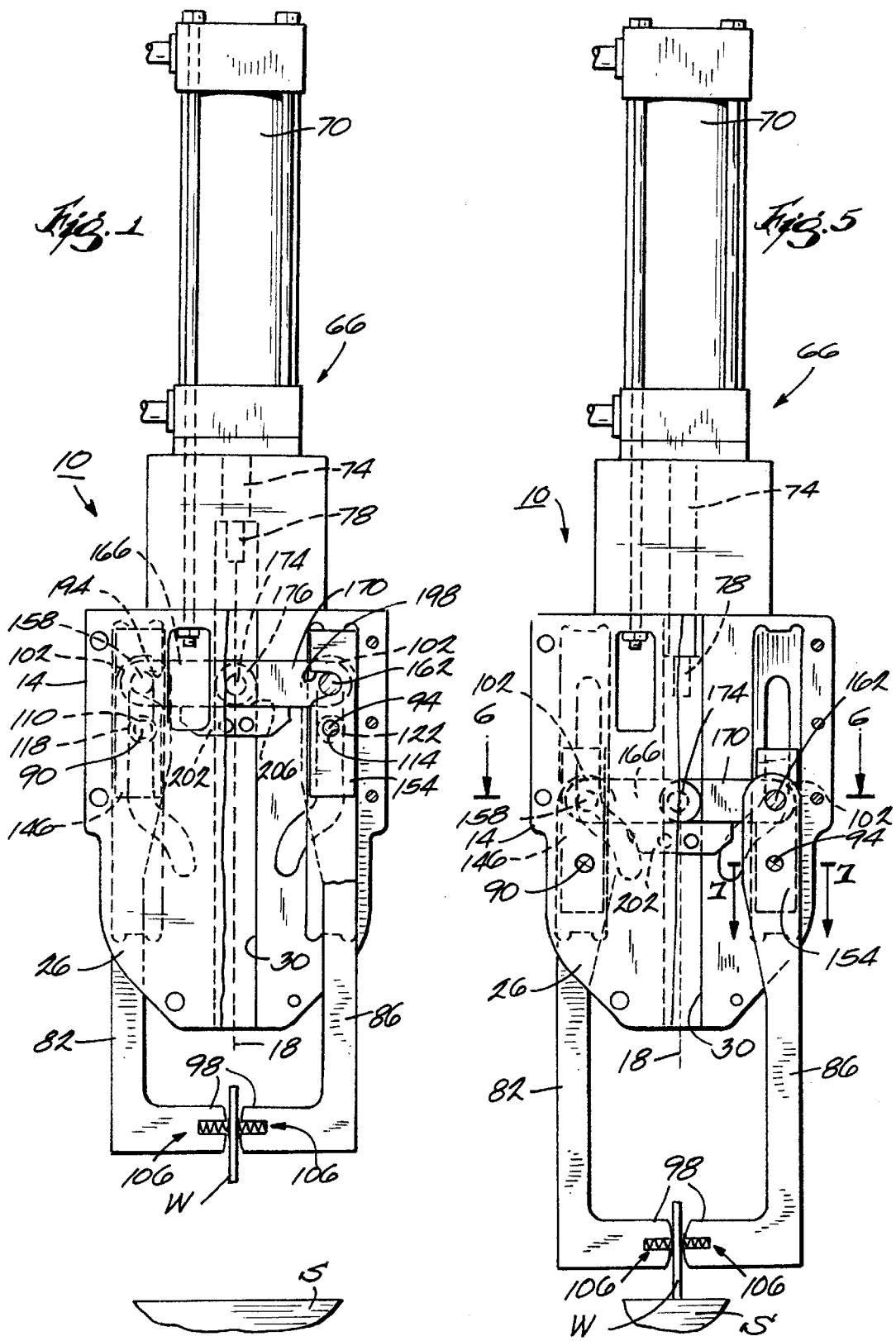
FIG. 1 is a side view of a clamping and lifting mechanism embodying the present invention and illustrating the mechanism in a clamped and lifted condition.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A clamping and lifting mechanism or clamp 10 embodying the invention is illustrated in the Figures. As shown in FIG. 1, the clamp 10 is operable to clamp and lift a workpiece W from a work surface S.

The clamp 10 includes (see FIGS. 1–5) a frame assembly 14 defining a longitudinal axis 18. For purposes of description, in FIGS. 1 and 3–5, "forward" is toward the bottom, and "rearward" is toward the top.

The frame assembly 14 includes (see FIG. 2) first and second body halves 22 and 26. The body halves 22 and 26 are mirror images of each other, and therefore, only the first body half 22 will be described in detail.

Figure 2:
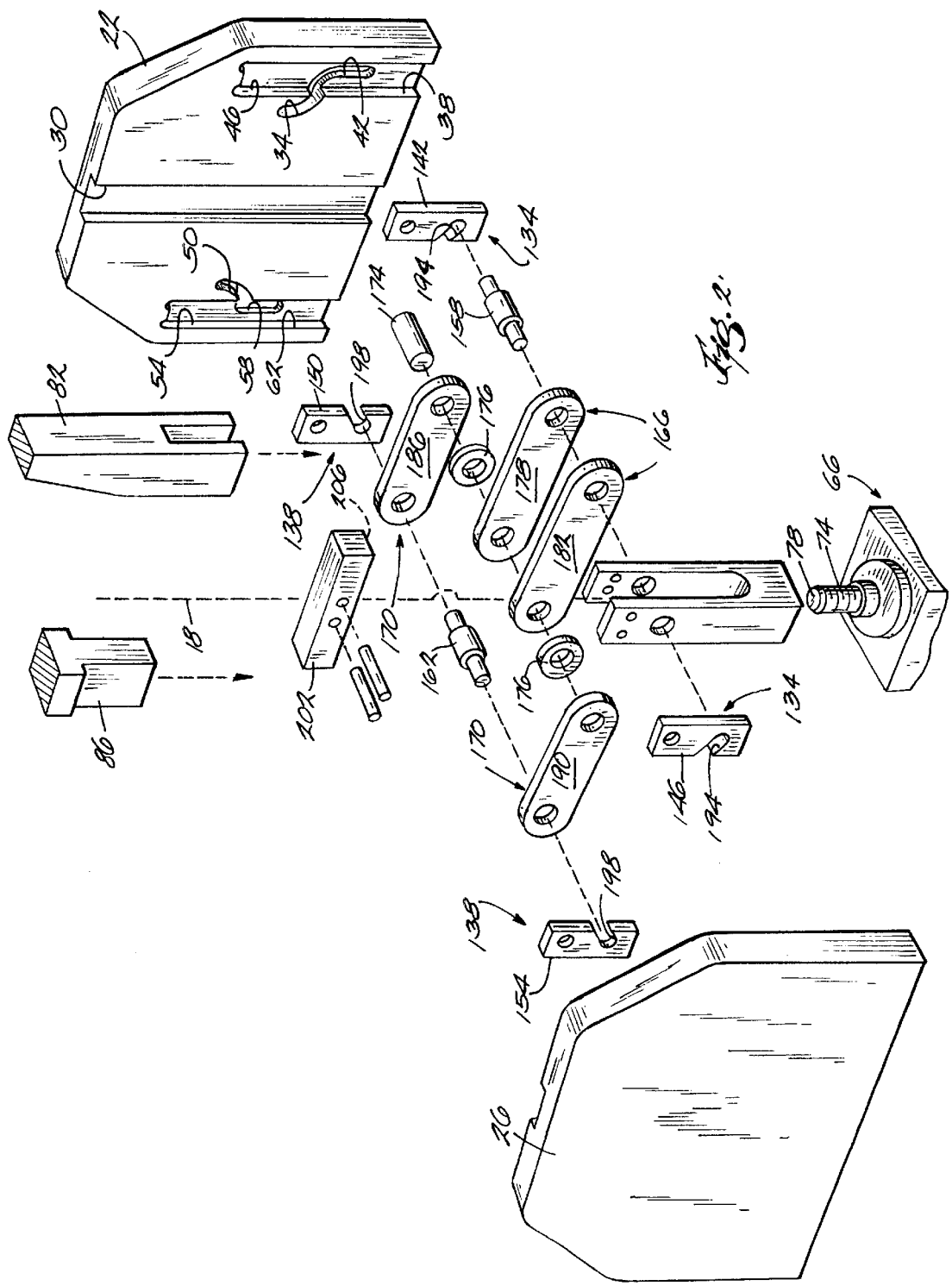
FIG. 2 is an exploded perspective view of the mechanism shown in FIG. 1.

As shown in FIG. 2, the first body half 22 defines an axially-extending center track 30 extending substantially parallel to the longitudinal axis 18. Preferably, the center track 30 defines the axis 18.

The first body half 22 also defines a first arcuate or cam track 34 extending through at least approximately ninety degrees about a first center of curvature. The first body half 22 also defines an axially-extending first track 38 extending substantially parallel to the axis 18 and to the center track 30. The first track 38 has a recessed portion 42 and a raised portion 46. The recessed portion 42 is at the same depth as the first cam track 34, and the rearward portion of the first cam track 34 meets the forward portion of the recessed portion 42 to form a first continuous recessed track.

In addition, the first body half 22 defines a second arcuate or cam track 50 which extends through at least approximately ninety degrees about a second center of curvature. The first body half 22 also defines an axially-extending second track 54 extending substantially parallel to the axis 18, the center track 30 and the first track 38. The second track 54 has a recessed portion 58 and a raised portion 62. The recessed portion 58 is at the same depth as the second cam track 50, and the rearward portion of the second cam track 50 meets the forward portion of the recessed portion 58 to form a second continuous recessed track.

The clamp 10 also includes (see FIGS. 1 and 3–5) an actuating assembly having a movable member movable between an extended position and a retracted position. In the illustrated construction, the actuating assembly is a piston and cylinder assembly 66. The piston and cylinder assembly 66 includes a cylinder 70 and a piston 74. The piston 74 has a projecting end 78, providing the movable member, and extends generally along the axis 18. The projecting end 78 is moveable between a retracted position (shown in FIG. 1), an intermediate position (shown in FIG. 5), and an extended position (shown in FIG. 3). In the illustrated construction, the piston and cylinder assembly 66 is a pneumatic assembly. In other constructions (not shown), the cylinder 70 may provide the movable member. In yet other constructions (not shown), the piston and cylinder assembly 66 may be a hydraulic assembly or a mechanical assembly, such as a screw-type assembly.

The clamp 10 also includes (see FIGS. 1 and 3–5) at least one clamp arm and, preferably, first and second clamp arms 82 and 86 supported by the frame assembly 14. The first and second clamp arms 82 and 86 are supported for pivotal movement about respective first and second pivot axes 90 and 94, and for axial movement relative to the frame assembly 14 and generally parallel to the axis 18. The clamp arms 82 and 86 are operatively connected to the projecting end 78 of the piston 74, as explained below in more detail, so that the clamp arms 82 and 86 are movable between an unclamped position (shown in FIG. 3), a clamped position (shown in FIG. 5), in which the workpiece W is clamped, and a clamped and lifted position (shown in FIG. 1), in which the workpiece W is clamped and lifted from the work surface S.

The clamp arms 82 and 86 each include a workpiece engaging end 98 and an opposite end 102. A spring assembly 106 is supported in each workpiece engaging end 98. The spring assemblies 106 limit the force applied by the clamp arms 82 and 86 to the workpiece W.

First and second pivot bores 110 and 114 are respectively defined in the first and second clamp arms 82 and 86 between the ends 98 and 102. First and second pivot pins 118 and 122 are respectively supported in the first and second pivot bores 110 and 114. The first and second pivot pins 118 and 122 respectively define first and second pivot axes 126 and 130 about which the first and second clamp arms 82 and 86 are pivoted.

Figure 6:
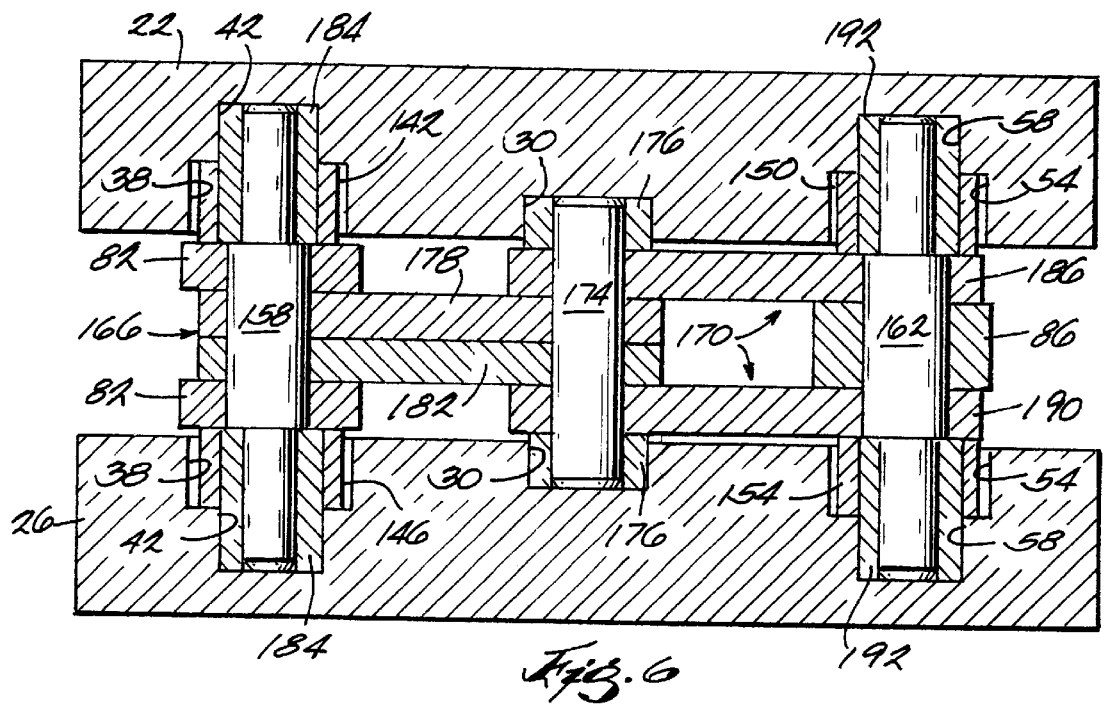
FIG. 6 is a cross-sectional view taken generally along line 6--6 in FIG. 5.
Figure 7:
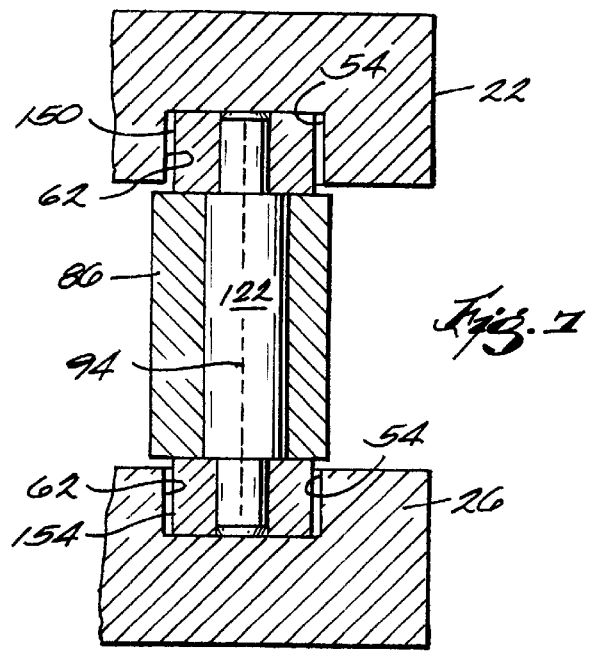
FIG. 7 is a cross-sectional view taken generally along line 7--7 in FIG. 5.

The clamp 10 also includes (see FIG. 2) first and second slider assembly 134 and 138 slidably supported by the frame assembly 14 for movement along the axis 18 in the first and second tracks 38 and 54, respectively. As shown in FIGS. 6 and 7, the slider assemblies 134 and 138 are not tightly fit within the first and second tracks 38 and 54 so that there is some play between the first and second slider assemblies 134 and 138 and the first and second tracks 38 and 54. The purpose for this loose fit is explained below in more detail.

The first slider assembly 134 includes (see FIG. 2) a slider member 142 supported in the first track 38 in the first body half 22 and a slider member 146 supported in the first track 38 in the second body half 26. The opposite ends of the first pivot pin 118 are supported in the slider members 142 and 146 so that the first pivot pin 118 is axially movable relative to the frame assembly 14.

Similarly, the second slider assembly 134 includes a slider member 150 supported in the second track 54 in the first body half 22 and a slider member 154 supported in the second track 54 in the second body half 26. The opposite ends of the second pivot pin 122 are supported in the slider members 150 and 154 so that the second pivot pin 122 is axially movable relative to the frame assembly 14.

To connect the clamp arms 82 and 86 to the piston 74, the clamp 10 also includes first and second link pins 158 and 162 and first and second link assemblies 166 and 170. The first link pin 158 is supported in the first clamp arm 82 proximate the end 102. The first link assembly 166 is connected between the first link pin 158 and a piston link pin 174 supported on the projecting end 78 of the piston 74 and operatively connects the first clamp arm 82 to the piston 74.

In the illustrated construction, rollers or track followers 176 are supported on opposite ends of the piston link pin 174. The track followers 176 move in the center track 30 and allow the piston 74 to move more smoothly between the extended and retracted positions.

In the preferred embodiment, the first link assembly 166 includes link members 178 and 182 connected adjacent opposite ends of the first link pin 158. As shown in FIG. 6, the opposite ends of the first link pin 158 extend beyond the link members 178 and 182 and into the first continuous recessed track so that the first link pin 158 also serves as a first track follower pin. A roller or track follower 184 is supported on each opposite end of the first link pin 158 to provide smoother movement along the first continuous recessed track.

As shown in FIG. 2, the second link pin 162 is similarly supported in the second clamp arm 86 proximate the end 102. The second link assembly 170 is connected between the second link pin 162 and the piston link pin 174 and operatively connects the second clamp arm 86 to the piston 74. In the preferred embodiment, the second link assembly 170 includes link members 186 and 190 connected adjacent opposite ends of the second link pin 162. As shown in FIG. 6, the opposite ends of the second link pin 162 extend beyond the link members 186 and 190 and into the second continuous recessed track so that the second link pin 162 also serves as a second track follower pin. A roller or track follower 192 is supported on each opposite end of the second link pin 162 to provide smoother movement along the second continuous recessed track.

As shown in FIG. 2, each slider member 142 and 146 of the first slider assembly 134 defines an arcuate first cam portion 194 to receive a portion of the first link pin 158. In the position illustrated in FIG. 3, the first cam portions 194 are substantially aligned with the first cam track 34 so that the first link pin 158 can move into and out of the first cam portions 194 and the first cam track 34. In the position illustrated in FIG. 1, the first cam portions 194 are substantially misaligned with the first cam track 34 so that the first link pin 158 is prevented from moving from the first cam portions 194 and into the first cam track 34.

As shown in FIG. 2, each slider member 150 and 154 of the second slider assembly 138 similarly defines an arcuate second cam portion 198 to receive a portion of the second link pin 162. In the position illustrated in FIG. 3, the second cam portions 198 are substantially aligned with the second cam track 50 so that the second link pin 162 can move into and out of the second cam portions 198 and the second cam track 50. In the position illustrated in FIG. 1, the second cam portions 198 are substantially misaligned with the second cam track 50 so that the second link pin 162 is prevented from moving from the second cam portions 198 and into the second cam track 50.

In the illustrated construction, the link pins 158 and 162 serve to connect the clamp arms 82 and 86 to the piston 74 and to provide track follower pins. It should be understood, however, that, in other constructions (not shown), separate members or pins could be provided as track follower pins. These separate pins would respectively engage the first and second arcuate tracks, the first and second tracks, and the first and second cam portions, as described above.

The clamp 10 also includes (see FIGS. 1–5) a lift insert 202 supported on the projecting end 78 of the piston 74. The lift insert 202 has a curved surface 206 which is engageable with the link assemblies 166 and 170. In the position shown in FIG. 1, the surface 206 engages the link assemblies 166 and 170 so that the link assemblies 166 and 170 are moved over-center to a toggled, locking position. As a result, a forward force must be applied to the clamp arms 82 and 86 or the piston 74 must apply a forward force to untoggle or unlock the link assemblies 166 and 170.

Figure 3:
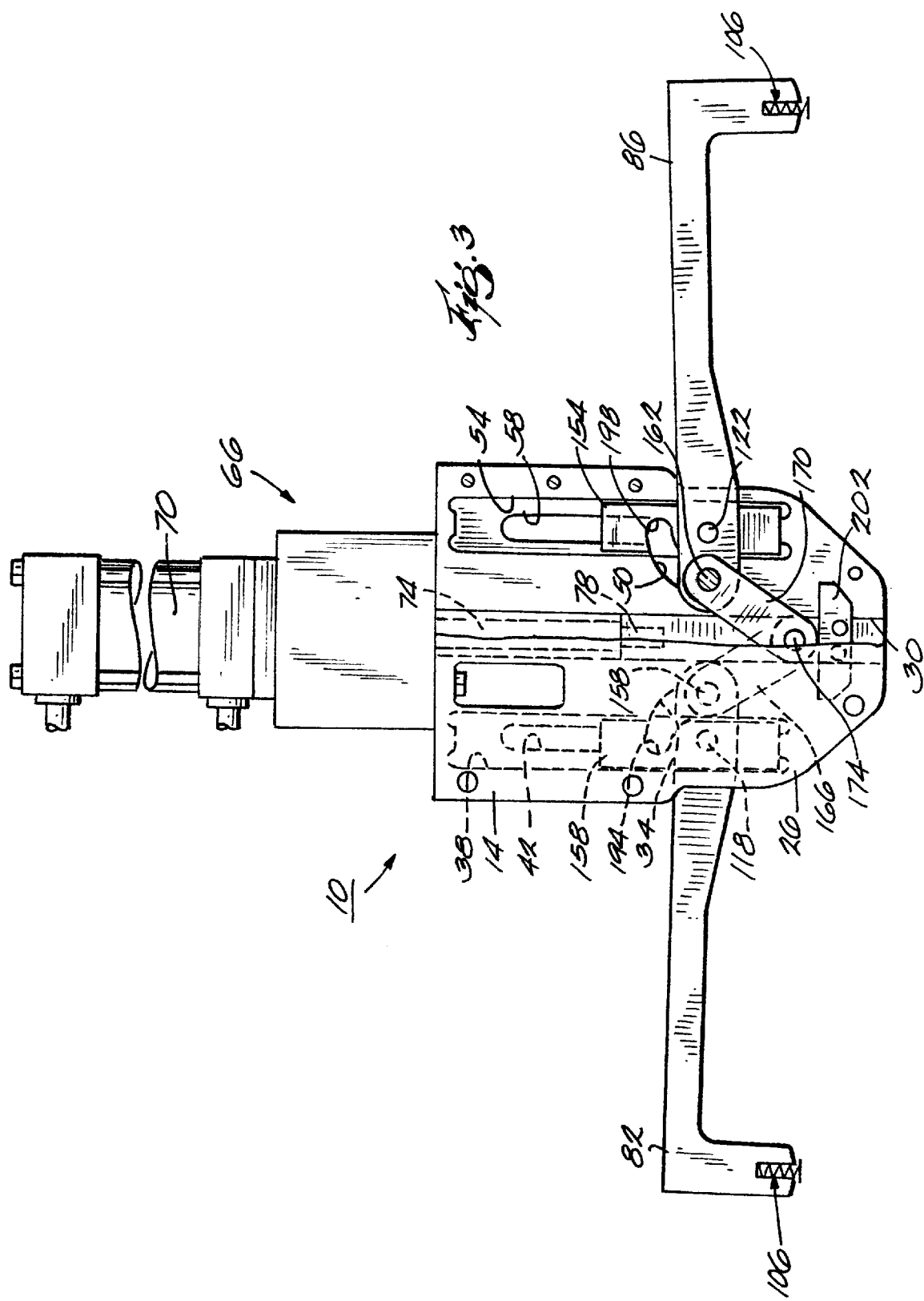
FIG. 3 is a side view of the mechanism shown in FIG. 1 with portions cut away and illustrating the mechanism in an unclamped condition.

In operation, the workpiece W is supported on the work surface S as shown in FIG. 3. The workpiece W or the clamp 10 are moved into position so that the clamp 10 can engage the workpiece W. In the preferred embodiment, the clamp 10 is movably supported on a support frame (not shown) so that the clamp 10 is movable about a work area to different work stations (not shown).

The clamp 10 is positioned in the unclamped condition (shown in FIG. 3). In this position, the piston 74 is in the forward, extended position, and the clamp arms 82 and 86 are thereby moved to the open, unclamped position. The slider assemblies 134 and 138 are in the forward-most position, and the first and second link pins 158 and 162 are in the forward-most portion of the first and second cam tracks 34 and 50, respectively.

Figure 4:
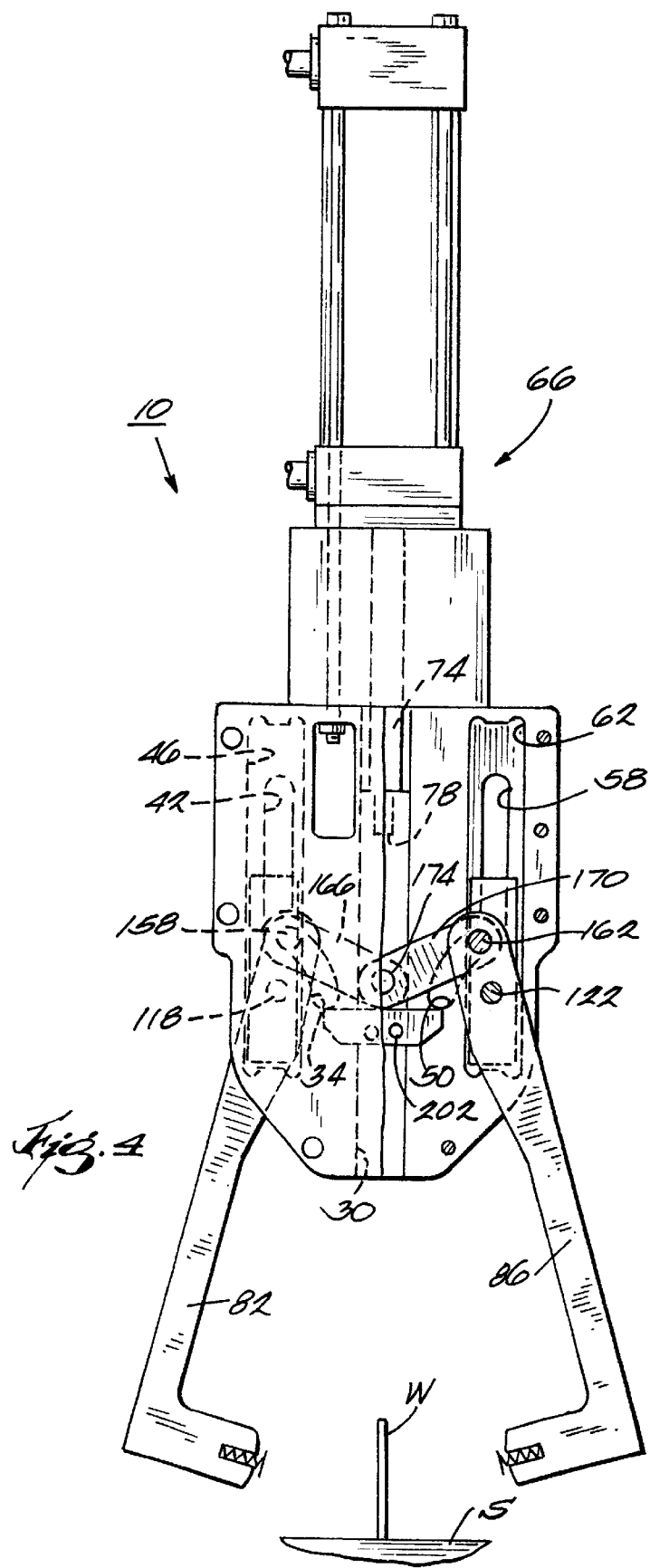
FIG. 4 is a side view of the mechanism shown in FIG. 1 and illustrating the mechanism in a condition between the unclamped condition and a clamped condition.

To clamp the workpiece W, the piston 74 is retracted. As shown in FIG. 4, as the piston 74 begins to retract from the extended position, the first and second link pins 158 and 162 move rearwardly along the first and second cam tracks 34 and 50. The first and second link pins 158 and 162 are moved toward the recessed portions 42 and 58 of the first and second tracks 38 and 54 and toward the first and second cam portions 194 and 198 of the first and second slider assemblies 134 and 138. Meanwhile, the slider assemblies 134 and 138 are maintained in the forward-most position.

The piston 74 continues to retract to the intermediate position (shown in FIG. 5) so that the clamp arms 82 and 86 clamp the workpiece W. The spring assemblies 106 engage the workpiece W to limit the clamping force applied to the workpiece W. The clamp 10 is in the clamped condition. In this position, the first and second link pins 158 and 162 have moved into the first and second cam portions 194 and 198 of the first and second slider assemblies 134 and 138. The first and second link pins 158 and 162 have also moved into the recessed portion 42 and 58 of the first and second tracks 38 and 54.

To lift the clamped workpiece W, the piston 74 continues to retract from the intermediate position (shown in FIG. 5) to the retracted position (shown in FIG. 1). In moving to the position shown in FIG. 1, the slider assemblies 134 and 138 are moved axially along the first and second tracks 38 and 54. The first and second cam portions 194 and 198 become misaligned with the first and second cam tracks 34 and 50 so that the first and second link pins 158 and 162 are prevented from moving back into the first and second cam tracks 34 and 50. In this manner, the clamp arms 82 and 86 are prevented from moving to an unclamped position while the workpiece W is in a lifted position (between the positions shown in FIGS. 1 and 5) and in the clamped and lifted position (shown in FIG. 1).

In the clamped and lifted position, the surface 206 of the lift insert 202 engages the link assemblies 166 and 170 to move the link assemblies 166 and 170 into the over-center, toggled and locked position. To move from this locked position, a forward force must be applied to the clamp arms 82 and 86 or to the link assemblies 166 and 170.

Because, as shown in FIGS. 6 and 7, there is play between the slider assemblies 134 and 138 and the first and second tracks 38 and 54, the force applied by the spring assemblies 106 causes the clamp arms 82 and 86 to pivot about the first and second link pins 158 and 162. This pivoting movement causes the slider assemblies 134 and 138 to also pivot about the first and second link pins and to become wedged in the first and second tracks 38 and 54. This "screen door" lock provides a mechanical lock to hold the clamp 10 in the clamped and lifted condition (shown in FIG. 1) even if fluid pressure is lost.

When the workpiece W is in the clamped and lifted condition (shown in FIG. 1), the workpiece W and the clamp 10 may be moved about the work area. The toggled position of the link assemblies 166 and 170 and the "screen door" lock on the slider assemblies 134 and 138 ensures that the clamp 10 is prevented from moving to an unclamped condition while the workpiece W is lifted or to an unlifted condition if fluid pressure is lost.

To release the workpiece W, the process is reversed. The piston 74 is extended from the retracted position until the workpiece W lowered to the work surface S and the clamp 10 is in the clamped condition (shown in FIG. 5). In this position, the slider assemblies 134 and 138 are moved to the forward-most position so that the first and second cam portions 194 and 198 of the slider assemblies 134 and 138 are again substantially aligned with the first and second cam tracks 34 and 50.

As the piston 74 continues to extend, the first and second link pins 158 and 162 move from the first and second cam portions 194 and 198 of the slider assemblies 134 and 138 and into the first and second cam tracks 34 and 50. The clamp arms 82 and 86 are pivoted about the pivot pins 118 and 122 to move to the unclamped position and release the workpiece W. Once the workpiece W is released, the clamp 10 may be moved to clamp and lift another workpiece (not shown) or may again clamp and lift the workpiece W to move the workpiece W to another work station.

It should be understood that the height to which the workpiece W is lifted by the clamp 10 can be adjusted by changing various factors, i.e., the length of the stroke of the piston 74, the length of the first and second tracks 38 and 54, and the length of the clamp arms 82 and 86.

While first and second clamp arms 82 and 86 are shown in the illustrated construction, it should be understood that the clamp 10 may be used with only a single clamp arm, such as clamp arm 82. If only one clamp arm is provided, only one of each of the components engaging the clamp arm, such as the pivot pin, the link pin, the link assembly, the slider assembly, etc., is required.

Figure 8:
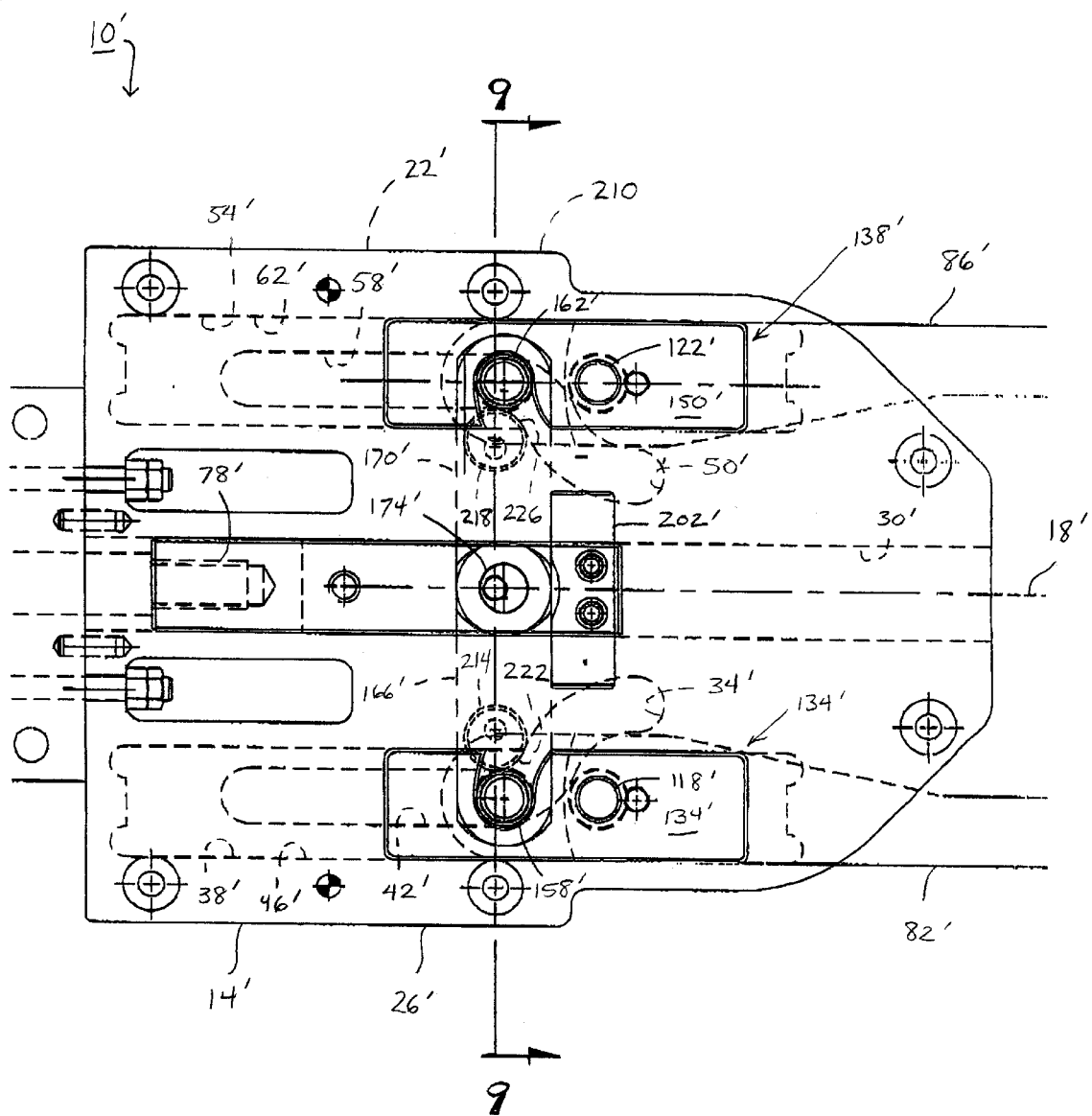
FIG. 8 is a side view of an alternative construction of a clamping and lifting mechanism embodying the present invention and illustrating the mechanism in a clamped condition.
Figure 9:
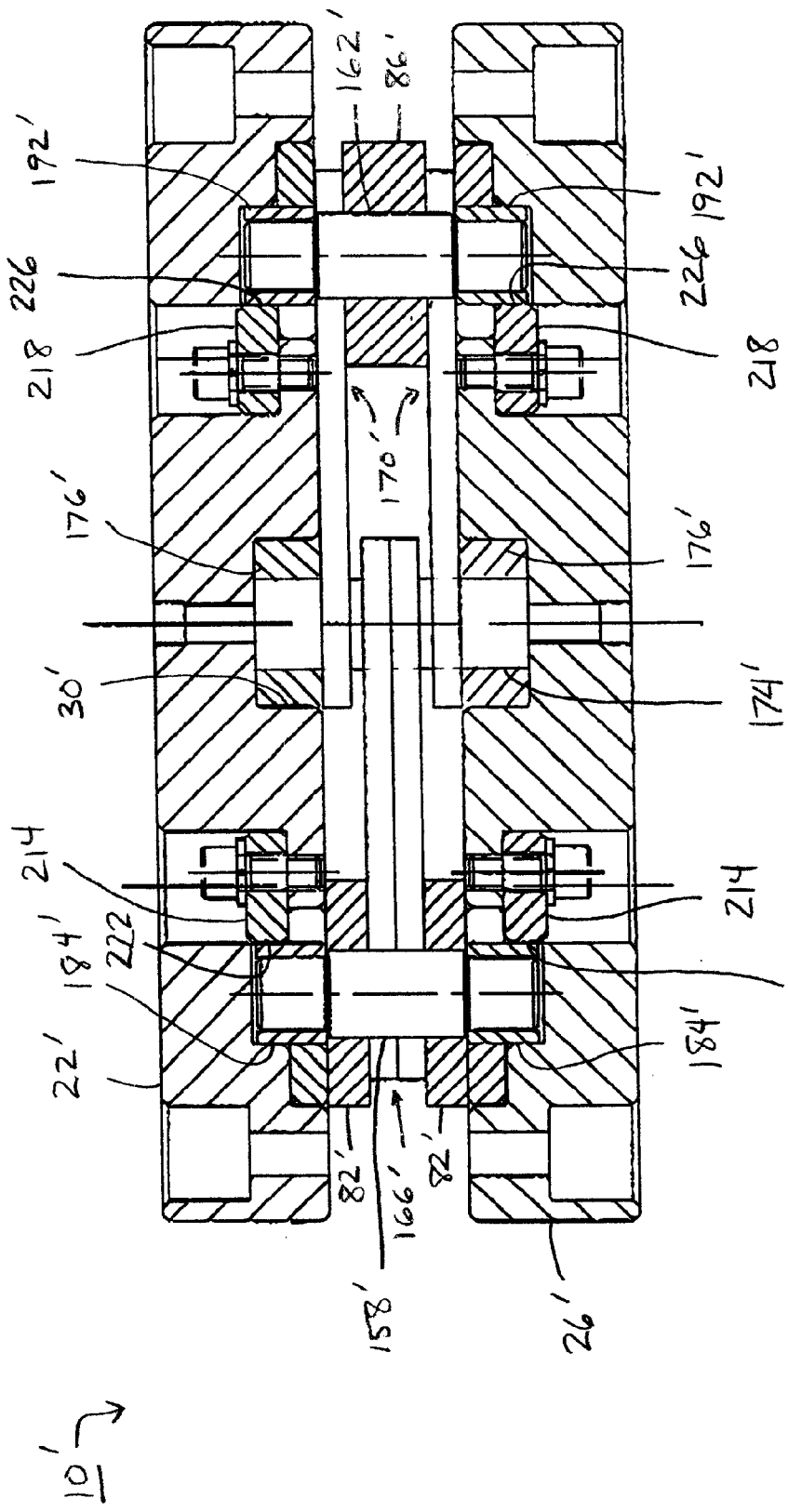
FIG. 9 is a cross-sectional view taken generally along line 9--9 in FIG. 8.

An alternative construction of a clamping and lifting mechanism or clamp 10' is illustrated in FIGS. 8–9. Common elements are identified by the same reference number "'".

As shown in FIGS. 8–9, the clamp 10' includes a frame 14' having body halves 22' and 26'. The body halves 22' and 26' are mirror images of each other, and therefore, only the first body half 22' will be described in detail.

As shown in FIGS. 8–9, the first body half 22' is provided by a first frame body portion 210 and insert portions 214 and 218 connected to the body portion 210, for example, by fasteners such as eccentric screws, such that the inserts 214 and 218 will not loosen yet are replaceable. The body portion 210 is formed of a high-strength steel alloy having a hardness less than 35 Rockwell(C) ("R/C"). Preferably, the body portion 210 has a hardness of between about 29 Rockwell(C) to about 33 Rockwell(C) and, most preferably, of about 30 Rockwell(C).

The insert portions 214 and 218 are formed of hardened material, such as hardened tool steel, which is harder than the material of the body portion 210. The insert portions 214 and 218 have a hardness greater than about 55 Rockwell(C). Preferably, the insert portions 214 and 218 have a hardness of between about 58 Rockwell(C) to about 62 Rockwell(C) and, most preferably, of about 60 Rockwell(C).

The body portion 210 and the first insert portion 214 cooperate to define a first arcuate or cam track 34', which extends through at least approximately ninety degrees about a first center of curvature, and an axially-extending first track 38', which extends substantially parallel to the axis 18' and to the center track 30'. The first track 38' has a recessed portion 42' and a raised portion 46'. The recessed portion 42' is at the same depth as the first cam track 34', and the rearward portion of the first cam track 34' meets the forward portion of the recessed portion 42' to form a first continuous recessed track. Preferably, the first insert portion 214 defines a surface of a track junction portion 222 of the first continuous recessed track.

Similarly, the body portion 210 and the second insert portion 218 cooperate to define a second arcuate or cam track 50', which extends through at least approximately ninety degrees about a second center of curvature, and an axially-extending second track 54', which extends substantially parallel to the axis 18', the center track 30' and the first track 38'. The second track 54' has a recessed portion 58' and a raised portion 62'. The recessed portion 58' is at the same depth as the second cam track 50', and the rearward portion of the second cam track 50' meets the forward portion of the recessed portion 58' to form a second continuous recessed track. Preferably, the second insert portion 218 defines a surface of a track junction portion 226 of the second continuous recessed track.

A hardened roller or track follower 184' is supported on each opposite end of a first link pin 158' to provide smoother movement along the first continuous recessed track, and a hardened roller or track follower 192' is supported on each opposite end of the second link pin 162' to provide smoother movement along the second continuous recessed track.

The surfaces of the track junction portions 222 and 226 (provided by the insert portions 214 and 218) are high-wear areas of the above-mentioned tracks. As the clamp 10' is operated, the track followers 184' and 192' bear on the insert portions 214 and 218, respectively. The hardened insert portions 214 and 218 provide improved wear-resistance in these areas. These track followers 184' and 192' reduce the wear on the first and second line pins 158' and 162', respectively, and on the first and second continuous recessed tracks, respectively.

It should be understood that, in other constructions (not shown), other portions of the above-mentioned tracks could be provide by the hardened insert portions 214 and 218 or by other insert portions (not shown).

Various features of the invention are set forth in the following claims.

We claim:

1. A clamp for clampingly engaging a portion of a workpiece and for lifting the workpiece from a work surface, said clamp comprising:

a frame assembly defining a longitudinal axis and a track, the frame assembly including a body portion formed of a first material and an insert connected to the body portion and formed of a second material, the second material being harder than the first material, the insert defining at least a portion of the track;

an actuating assembly supported by the frame assembly and including a movable member movable between a retracted position and an extended position;

a clamp arm supported by the frame assembly for pivotal movement about a pivot axis and for axial movement relative to the frame assembly along the longitudinal axis, the clamp arm being connected to the movable member so that the clamp arm is movable between an unclamped position, in which the workpiece is not clampingly engaged by the clamp arm, and a clamped and lifted position, in which the workpiece is clampingly engaged by the clamp arm and is lifted from the work surface by the clamp arm; and a pin supported by the frame assembly for movement in the track, the pin connecting the clamp arm and one of the frame assembly and the movable member.

2. The clamp as set forth in claim 1 wherein the clamp arm has a workpiece engaging end and an opposite end, wherein the pin is a link pin supported proximate the opposite end of the clamp arm, and wherein said clamp further comprises a link member connecting the clamp arm and the link pin to the movable member such that movement of the movable member between the extended position and the retracted position causes movement of the clamp arm between the unclamped position and the clamped and lifted position.

3. The clamp as set forth in claim 1 wherein the frame assembly defines an axially extending track and an arcuate track, wherein the pin is a track follower pin supported by the clamp arm, the track follower pin being movable in the axially extending track and the arcuate track, and wherein the insert defines at least a portion of at least one of the axially extending track and the arcuate track.

4. The clamp as set forth in claim 3 wherein the axially extending track and the arcuate track communicate at a track junction, and wherein the insert defines at least a surface of the track junction, the track follower pin being movable along the surface of the track junction between the axially extending track and the arcuate track.

5. The clamp as set forth in claim 3 wherein the track follower pin is positioned in the arcuate track when the clamp arm is in the unclamped position, wherein the track follower pin moves along the arcuate track as the clamp arm moves from the unclamped position to the clamped position, and wherein the track follower pin moves along the axially extending track as the clamp arm moves from the clamped position to the clamped and lifted position.

6. The clamp as set forth in claim 3 and further comprising a slider member supported in the axially extending track for axial movement along the axially extending track relative to the frame assembly, the slider member defining a cam portion, and wherein a portion of the track follower pin moves into the cam portion as the track follower pin moves from the arcuate track to the axially extending track.

7. The clamp as set forth in claim 6 wherein the cam portion is substantially aligned with the arcuate track when the clamp arm is in the clamped position, and wherein the cam portion is substantially misaligned with the arcuate track as the clamp arm moves from the clamped position to the clamped and lifted position, such that the clamp arm is prevented from moving to an unclamped position.

8. The clamp as set forth in claim 3 and further comprising a link member connecting the clamp arm and the track follower pin to the movable member such that movement of the movable member between the extended position and the retracted position causes movement of the clamp arm between the unclamped position and the clamped and lifted position.

9. The clamp as set forth in claim 8 wherein the frame assembly defines an axially extending center track, and wherein said clamp further comprises:
    a movable member link pin supported by the movable member and connecting the movable member to the link member; and
    a roller supported by the movable member link pin and movable along the center track.

10. The clamp as set forth in claim 8 and further comprising a lift member supported by the movable member, the lift member having a surface engageable with the link member, and wherein, when the clamp arm is moved to the clamped and lifted position, the surface engages the link member to move the link member to an over-center position.

11. The clamp as set forth in claim 3 wherein the clamp arm is prevented from moving to an unclamped position as the track follower pin moves along the axially extending track.

12. The clamp as set forth in claim 3 and further comprising a track follower supported by the track follower pin, the track follower being movable along the arcuate track and along the axially extending track.

13. The clamp as set forth in claim 1 wherein the first material has a hardness of less than 35 Rockwell(C), and wherein the second material has a hardness greater than 55 Rockwell(C).

14. The clamp as set forth in claim 13 wherein the first material has a hardness of less than or equal to 33 Rockwell (C), and wherein the second material has a hardness of greater than or equal to about 58 Rockwell(C).

15. The clamp as set forth in claim 1 wherein the first material has a hardness of about 30 Rockwell(C), and wherein the second material has a hardness of about 60 Rockwell(C).

16. The clamp as set forth in claim 1 wherein the movable member is movable from the extended position to an intermediate position to cause pivotal movement of the clamp arm from the unclamped position to a clamped position, in which the workpiece is clampingly engaged by the clamp arm, and wherein the movable member is further movable from the intermediate position to the retracted position to cause axial movement of the clamp arm to the clamped and lifted position.

17. The clamp as set forth in claim 1 wherein the pivot axis is axially movable relative to the frame assembly, and wherein the pivot axis is axially moved relative to the frame assembly as the clamp arm is moved from the clamped position to the clamped and lifted position.

18. The clamp as set forth in claim 1 and further comprising a pivot pin respectively defining the pivot axis, the pivot pin being supported by the frame assembly for axial movement relative to the frame assembly, and wherein the pivot pin is axially moved relative to the frame assembly as the clamp arm is moved from the clamped position to the clamped and lifted position.

19. The clamp as set forth in claim 18 wherein the frame assembly defines an axially extending track, wherein the pivot pin is supported in the track for axial movement along the track relative to the frame assembly.

20. The clamp as set forth in claim 19 and further comprising a slider member supported in the track for axial movement along the track relative to the frame assembly, the slider member supporting the pivot pin so that the pivot pin is axially movable relative to the frame assembly.

21. The clamp as set forth in claim 1 wherein the actuating assembly includes a fluid actuated piston and cylinder assembly including a reciprocating piston, the piston having a projecting end providing the movable member and being movable between the retracted position and the extended position.

22. The clamp as set forth in claim 1 and further comprising a second clamp arm supported by the frame assembly for pivotal movement about a second pivot axis and for axial movement relative to the frame assembly along the longitudinal axis, the second clamp arm being connected to the movable member so that the first-mentioned clamp arm and the second clamp arm are movable between the unclamped position, in which the workpiece is not clampingly engaged by the first-mentioned clamp arm and the second clamp arm, and a clamped and lifted position, in which the workpiece is clampingly engaged by the first-mentioned clamp arm and the second clamp arm and is lifted from the work surface by the first-mentioned clamp arm and the second clamp arm.

23. A clamp for clampingly engaging a portion of a workpiece and for lifting the workpiece from a work surface, said clamp comprising:
    a frame assembly defining a longitudinal axis and a track, the frame assembly including a body portion formed of a first material and an insert connected to the body portion and formed of a second material, the second material being harder than the first material, the insert defining at least a portion of the track;
    an actuating assembly supported by the frame assembly and including a movable member movable between a retracted position and an extended position;
    a clamp arm supported by the frame assembly for pivotal movement about a pivot axis and for axial movement relative to the frame assembly along the longitudinal axis, the clamp arm having a workpiece engaging end and an opposite end, the clamp arm being connected to the movable member so that the clamp arm is movable between an unclamped position, in which the workpiece is not clampingly engaged by the clamp arm, and a clamped and lifted position, in which the workpiece is clampingly engaged by the clamp arm and is lifted from the work surface by the clamp arm;

a link pin supported proximate the opposite end of the clamp arm for movement in the track; and a link member connecting the clamp arm and the link pin to the movable member such that movement of the movable member between the extended position and the retracted position causes movement of the clamp arm between the unclamped position and the clamped and lifted position.

24. The clamp as set forth in claim 23 wherein the frame assembly defines an axially extending track and an arcuate track, wherein the link pin is movable in the axially extending track and the arcuate track, and wherein the insert defines at least a portion of at least one of the axially extending track and the arcuate track.

25. The clamp as set forth in claim 24 wherein the axially extending track and the arcuate track communicate at a track junction, and wherein the insert defines at least a surface of the track junction, the link pin being movable along the surface of the track junction between the axially extending track and the arcuate track.

26. The clamp as set forth in claim 23 and further comprising a track follower supported by the track follower pin, the track follower being movable along the arcuate track and along the axially extending track.

27. The clamp as set forth in claim 23 wherein the first material has a hardness of about 30 Rockwell(C), and wherein the second material has a hardness of about 60 Rockwell(C).

28. A clamp for clampingly engaging a portion of a workpiece and for lifting the workpiece from a work surface, said clamp comprising:

a frame assembly defining a longitudinal axis and defining an axially extending track and an arcuate track, the frame assembly including a body portion formed of a first material and an insert connected to the body portion and formed of a second material, the second material being harder than the first material, the insert defining at least a portion of at least one of the axially extending track and the arcuate track;

an actuating assembly supported by the frame assembly and including a movable member movable between a retracted position and an extended position;

a clamp arm supported by the frame assembly for pivotal movement about a pivot axis and for axial movement relative to the frame assembly along the longitudinal axis, the clamp arm being connected to the movable member so that the clamp arm is movable between an unclamped position, in which the workpiece is not clampingly engaged by the clamp arm, and a clamped and lifted position, in which the workpiece is clampingly engaged by the clamp arm and is lifted from the work surface by the clamp arm; and a track follower pin supported by the clamp arm for movement in the axially extending track and the arcuate track.

29. The clamp as set forth in claim 28 wherein the axially extending track and the arcuate track communicate at a track junction, and wherein the insert defines at least a surface of the track junction, the track follower pin being movable along the surface of the track junction between the axially extending track and the arcuate track.

30. The clamp as set forth in claim 28 and further comprising a track follower supported by the track follower pin, the track follower being movable along the arcuate track and along the axially extending track.

31. The clamp as set forth in claim 28 wherein the first material has a hardness of about 30 Rockwell(C), and wherein the second material has a hardness of about 60 Rockwell(C).

32. The clamp as set forth in claim 28 and further comprising a link member connecting the clamp arm and the track follower pin to the movable member such that movement of the movable member between the extended position and the retracted position causes movement of the clamp arm between the unclamped position and the clamped and lifted position.

33. A clamp for clampingly engaging a portion of a workpiece and for lifting the workpiece from a work surface, said clamp comprising:

a frame assembly defining a longitudinal axis and defining a first axially extending track, a first arcuate track, a second axially extending track and a second arcuate track, the frame assembly including a body portion formed of a first material and a first insert and a second insert connected to the body portion and formed of a second material, the second material being harder than the first material, the first insert defining at least a portion of one of the first axially extending track and the first arcuate track, the second insert defining at least a portion of the second axially extending track and the second arcuate track;

an actuating assembly supported by the frame assembly and including a movable member movable between a retracted position and an extended position;

a first clamp arm and a second clamp arm supported by the frame assembly for pivotal movement about respective a first pivot axis and a second pivot axis and for axial movement relative to the frame assembly along the longitudinal axis, the first clamp arm and the second clamp arm being connected to the movable member so that the first clamp arm and the second clamp arm are movable between an unclamped position, in which the workpiece is not clampingly engaged by the first clamp arm and the second clamp arm, and a clamped and lifted position, in which the workpiece is clampingly engaged by the first clamp arm and the second clamp arm and is lifted from the work surface by the first clamp arm and the second clamp arm;

a first track follower pin supported by the first clamp arm for movement in the first axially extending track and the first arcuate track; and a second track follower pin supported by the second clamp arm for movement in the second axially extending track and the second arcuate track.

34. The clamp as set forth in claim 33 wherein the first clamp arm and the second clamp arm each have a workpiece engaging end and an opposite end, wherein the first track follower pin is supported proximate the opposite end of the first clamp arm, wherein the second link pin is supported proximate the opposite end of the second clamp arm, and wherein said clamp further comprises a first link member and a second link member, the first link member connecting the first clamp arm and the first link pin to the movable member, and the second link member connecting the second clamp arm and the second link pin to the movable member such that movement of the movable member between the extended position and the retracted position causes movement of the first and second clamp arms between the unclamped position and the clamped and lifted position.

35. The clamp as set forth in claim 33 wherein the first axially extending track and the first arcuate track communicate at a track junction, and wherein the first insert defines at least a surface of the track junction, the first track follower pin being movable along the surface of the track junction between the first axially extending track and the first arcuate track.

36. The clamp as set forth in claim 34 wherein the second axially extending track and the second arcuate track communicate at a second track junction, and wherein the second insert defines at least a surface of the second track junction, the second track follower pin being movable along the surface of the second track junction between the second axially extending track and the second arcuate track.

37. The clamp as set forth in claim 33 and further comprising a track follower supported by the first track follower pin, the track follower being movable along the first arcuate track and along the first axially extending track.

38. The clamp as set forth in claim 37 and further comprising a second track follower supported by the second track follower pin, the second track follower being movable along the second arcuate track and along the second axially extending track.

39. The clamp as set forth in claim 33 wherein the first material has a hardness of about 30 Rockwell(C), and wherein the second material has a hardness of about 60 Rockwell(C).

* * * * *